United States Patent
Higashino et al.

(10) Patent No.: US 12,412,917 B2
(45) Date of Patent: Sep. 9, 2025

(54) PROTON-CONDUCTIVE CELL STRUCTURE, PROTON-CONDUCTIVE MATERIAL, ELECTROCHEMICAL DEVICE, AND METHOD OF MANUFACTURING PROTON-CONDUCTIVE MATERIAL

(71) Applicant: SUMITOMO ELECTRIC INDUSTRIES, LTD., Osaka (JP)

(72) Inventors: Takahiro Higashino, Osaka (JP); Yohei Noda, Osaka (JP); Naho Mizuhara, Osaka (JP); Mitsuyasu Ogawa, Osaka (JP); Hiromasa Tawarayama, Osaka (JP); Masatoshi Majima, Osaka (JP); Akiko Funakoshi, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 478 days.

(21) Appl. No.: 17/927,579

(22) PCT Filed: May 28, 2021

(86) PCT No.: PCT/JP2021/020453
§ 371 (c)(1),
(2) Date: Nov. 23, 2022

(87) PCT Pub. No.: WO2021/256221
PCT Pub. Date: Dec. 23, 2021

(65) Prior Publication Data
US 2024/0006642 A1    Jan. 4, 2024

(30) Foreign Application Priority Data
Jun. 18, 2020 (JP) .................. 2020-104994

(51) Int. Cl.
*H01M 8/1253* (2016.01)
*H01M 8/1213* (2016.01)
*H01M 8/12* (2016.01)

(52) U.S. Cl.
CPC ....... *H01M 8/1253* (2013.01); *H01M 8/1213* (2013.01); *H01M 2008/1293* (2013.01); *H01M 2300/0077* (2013.01)

(58) Field of Classification Search
CPC ............ H01M 8/1253; H01M 8/1213; H01M 2008/1293; H01M 2300/0077; H01M 8/02; H01M 2300/0074; H01M 4/9033; H01M 8/126; H01M 8/12; H01M 8/124; H01M 8/1246; C25B 1/042; C25B 11/077; C25B 13/07; C25B 9/23; Y02E 60/50; Y02P 70/50; H01B 1/08
See application file for complete search history.

(56) References Cited

U.S. PATENT DOCUMENTS

| | | |
|---|---|---|
| 6,528,195 B1 | 3/2003 | Taniguchi |
| 2001/0018989 A1 | 9/2001 | Taniguchi |
| 2003/0124403 A1 | 7/2003 | Taniguchi |
| 2005/0260477 A1 | 11/2005 | Taniguchi |
| 2015/0162634 A1* | 6/2015 | Lee ................ C04B 35/64 264/621 |
| 2015/0221407 A1* | 8/2015 | Zenitani ........... C01G 25/006 252/62.2 |
| 2015/0225859 A1 | 8/2015 | Zenitani et al. |
| 2017/0149082 A1* | 5/2017 | Thangadurai ........... H01B 1/08 |
| 2018/0022655 A1 | 1/2018 | Majima et al. |
| 2018/0037508 A1 | 2/2018 | Higashino |
| 2021/0005916 A1 | 1/2021 | Hiigashino et al. |
| 2024/0006642 A1* | 1/2024 | Higashino .......... H01M 8/1213 |

FOREIGN PATENT DOCUMENTS

| | | |
|---|---|---|
| EP | 3023995 A1 | 5/2016 |
| JP | 2001-307546 A | 11/2001 |
| JP | 2007-197315 A | 8/2007 |
| JP | 2009-231075 A | 10/2009 |
| JP | 2016-103409 A | 6/2016 |
| JP | 2016-160111 A | 9/2016 |
| JP | 2017-071830 A | 4/2017 |
| WO | 2016/157566 A1 | 10/2016 |
| WO | 2019/107194 A1 | 6/2019 |

OTHER PUBLICATIONS

International Search Report for corresponding Application No. PCT/JP2021/020453, mailed Aug. 10, 2021.

* cited by examiner

*Primary Examiner* — Muhammad S Siddiquee
(74) *Attorney, Agent, or Firm* — Renner, Otto, Boisselle & Sklar, LLP

(57) ABSTRACT

A proton-conductive cell structure includes an air electrode, a hydrogen electrode, and a solid electrolyte layer disposed between the air electrode and the hydrogen electrode, wherein the solid electrolyte layer includes at least a first solid electrolyte layer formed of a compact material. The first solid electrolyte layer includes a metal oxide having a perovskite structure and represented by Formula 1 below, a ratio of Sr to a total amount of Ba and Sr in an air-electrode-side near-surface region of the first solid electrolyte layer is 0.4 or more, and a ratio of Sr to a total amount of Ba and Sr in a hydrogen-electrode-side near-surface region of the first solid electrolyte layer is 0.003 to 0.3.

$$Ba_{x1}Sr_{x2}A_{1-y}M_yO_{3-\delta} \quad (1).$$

13 Claims, 7 Drawing Sheets

PROTON-CONDUCTIVE CELL STRUCTURE, PROTON-CONDUCTIVE MATERIAL, ELECTROCHEMICAL DEVICE, AND METHOD OF MANUFACTURING PROTON-CONDUCTIVE MATERIAL

TECHNICAL FIELD

The present disclosure relates to a proton-conductive cell structure, a proton-conductive material, an electrochemical device and a method of manufacturing a proton-conductive material. This application claims priority based on Japanese Patent Application No. 2020-104994 filed on Jun. 18, 2020, and the entire contents of the Japanese patent application are incorporated herein by reference.

BACKGROUND ART

As a solid electrolyte that can be applied to PCFC (Protonic Ceramic Fuel Cells) using hydrogen ions (protons) as charge carriers, a proton-conductive metal oxide having a perovskite structure is known (for example, PTL1 to PTL4).

PRIOR ART DOCUMENT

Patent Literature

PTL 1: Japanese Unexamined Patent Application Publication No. 2001-307546
PTL 2: Japanese Unexamined Patent Application Publication No. 2007-197315
PTL 3: Japanese Unexamined Patent Application Publication No. 2016-103409
PTL 4: Japanese Unexamined Patent Application Publication No. 2016-160111

SUMMARY OF INVENTION

A proton-conductive cell structure of the present disclosure is a cell structure includes an air electrode, a hydrogen electrode, and a solid electrolyte layer disposed between the air electrode and the hydrogen electrode. The solid electrolyte layer at least includes a first solid electrolyte layer formed of a compact material, the first solid electrolyte layer includes a metal oxide having a perovskite structure and represented by Formula (1) below:

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x1+x2 \leq 1.10$ and $0 < y \leq 0.5$ are satisfied), in an air-electrode-side near-surface region of the first solid electrolyte layer, a ratio of Sr to a total amount of Ba and Sr (Sr/[Ba+Sr]: based on a number of atoms) is 0.4 or more, and in a hydrogen-electrode-side near-surface region of the first solid electrolyte layer, the ratio of Sr to the total amount of Ba and Sr (Sr/[Ba+Sr]) is 0.003 to 0.3.

A proton-conductive material of the present disclosure is a proton-conductive material used as the first solid electrolyte layer in the proton-conductive cell structure of the present disclosure. The proton-conductive material is a layer material formed of a compact material, and includes a metal oxide having a perovskite structure and represented by Formula (1) below:

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x1+x2 \leq 1.10$ and $0 < y \leq 0.5$ are satisfied), in a region near a first main surface, a ratio of Sr to a total amount of Ba and Sr (Sr/[Ba+Sr]: based on a number of atoms) is 0.4 or more, and in a region near a second main surface, the ratio of Sr to the total amount of Ba and Sr (Sr/[Ba+Sr]) is 0.003 to 0.3.

An electrochemical device of the present disclosure includes the proton-conductive cell structure of the present disclosure.

One of the method of manufacturing a proton-conductive material of the present disclosure is a method of manufacturing a proton-conductive material used as the first solid electrolyte layer of the proton-conductive cell structure of the present disclosure, the method including bringing, into contact with an air-electrode-side surface of a first solid electrolyte precursor layer including a metal oxide having a perovskite structure and represented by Formula (2) below:

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x1 \leq 1.10$ and $0 < y \leq 0.5$ are satisfied), a mixture of a powder of a strontium compound and a powder of a metal oxide having a perovskite structure and represented by Formula (3) below:

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x2 \leq 1.10$ and $0 < y \leq 0.5$ are satisfied), and in this state, performing heat-treatment at 1200° C. to 1400° C.

Another one of the method of manufacturing a proton-conductive material is a method of manufacturing a proton-conductive material used as the solid electrolyte layer of the proton-conductive cell structure of the present disclosure, the method including applying, to an air-electrode-side surface of a first solid electrolyte precursor layer including a metal oxide having a perovskite structure and represented by Formula (2) below:

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x1 \leq 1.10$ and $0 < y \leq 0.5$ are satisfied), a paste including a binder, a powder of a strontium compound, and a powder of a metal oxide having a perovskite structure and represented by Formula (3) below:

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x2 \leq 1.10$ and $0 < y \leq 0.5$ are satisfied), and in this state, performing heat-treatment at 1200° C. to 1400° C.

DESCRIPTION OF EMBODIMENTS

Figure 1:
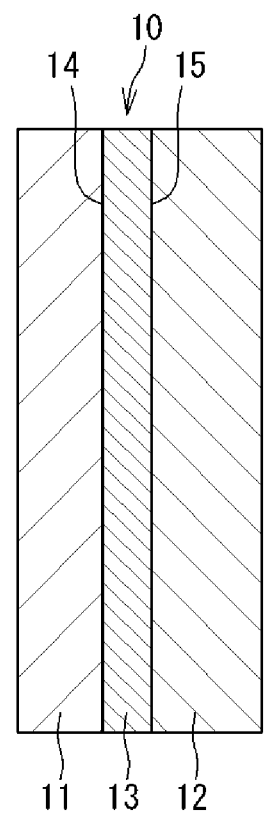
FIG. 1 is a schematic view showing an example of a proton-conductive cell structure according to the present disclosure.

Problems to be Solved by Present Disclosure

Yttrium-doped barium zirconate (BZY) is one of proton-conductive metal oxides, and exhibits good proton conductivity even in a temperature range of 700° C. or less, and thus is expected as a solid electrolyte for medium-temperature fuel cells and steam electrolysis cells.

However, in BZY, hole conduction occurs in an oxygen atmosphere, and an electromotive force decreases due to a leakage current, or current efficiency during steam electrolysis decreases in some cases.

Yttrium-doped strontium zirconate (SZY) is also one of the proton-conductive metal oxides. SZY has a higher ion transport number than BZY, but has an extremely high resistance, which is disadvantageous for use in a fuel cell.

It is an object of the present disclosure to provide a proton-conductive material capable of achieving both a high ion transport number and a low resistance value.

Advantageous Effects of Present Disclosure

According to the present disclosure, it is possible to provide a proton-conductive material capable of achieving both a high ion transport number and a low resistance value, and a method of manufacturing the same.

In addition, according to the present disclosure, it is possible to provide a proton-conductive cell structure using the proton-conductive material and an electrochemical device including the proton-conductive cell structure.

DESCRIPTION OF EMBODIMENTS

First, the contents of the present disclosure will be listed and explained.

(1) A proton-conductive cell structure according to the present disclosure is a cell structure includes an air electrode, a hydrogen electrode, and a solid electrolyte layer disposed between the air electrode and the hydrogen electrode. The solid electrolyte layer at least includes a first solid electrolyte layer formed of a compact material, the first solid electrolyte layer includes a metal oxide having a perovskite structure and represented by Formula (1) below:

$$Ba_{x1}Sr_{x2}A_{1-y}M_yO_{3-\delta} \qquad (1)$$

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x1+x2 \leq 1.10$ and $0 < y \leq 0.5$ are satisfied), in an air-electrode-side near-surface region of the first solid electrolyte layer, a ratio of Sr to a total amount of Ba and Sr (Sr/[Ba+Sr]: based on a number of atoms) is 0.4 or more, and in a hydrogen-electrode-side near-surface region of the first solid electrolyte layer, the ratio of Sr to the total amount of Ba and Sr (Sr/[Ba+Sr]) is 0.003 to 0.3.

According to the proton-conductive cell structure described in the above (1), since the proton-conductive cell structure includes the solid electrolyte layer which contains the metal oxide represented by the Formula (1) above and in which the content ratio of Ba and Sr is inclined so that Ba increases and Sr decreases from the surface of the air-electrode-side toward the inside of the solid electrolyte layer, it is possible to increase the ion transport number while maintaining low resistance, compared to a proton-conductive cell structure including a solid electrolyte layer made of BZY.

Therefore, the proton-conductive cell structure is suitable for providing a fuel cell or the like having both a high ion transport number and a high output.

(2) In the proton-conductive cell structure according to (1), it is preferable that in a central region in a thickness direction of the first solid electrolyte layer, the ratio of Sr to the total amount of Ba and Sr (Sr/[Ba+Sr]) is 0.005 to 0.3.

In this case, it is more suitable for increasing the ion transport number while maintaining low resistance.

(3) In the proton-conductive cell structure according to (1) or (2), it is preferable that in the first solid electrolyte layer, in a region extending, in a thickness direction, from an air-electrode-side surface toward a hydrogen electrode side and corresponding to 6% of a total thickness, the ratio of Sr to the total amount of Ba and Sr (Sr/[Ba+Sr]) is 0.3 or more.

Also in this case, it is more suitable for increasing the ion transport number while maintaining low resistance.

(4) In the proton-conductive cell structure according to any one of (1) to (3), it is preferable that in the metal oxide represented by the Formula (1) above, 50 at % (atomic percent) or more of Element A is Zr, and Element M is Y. When half or more of Element A is Zr, chemical stability may be enhanced. When Element M is Y, the proton conductivity may be increased.

(5) In the proton-conductive cell structure according to any one of (1) to (3), it is preferable that the solid electrolyte layer further includes a second solid electrolyte layer disposed between the first solid electrolyte layer and the air electrode and formed of a porous material, and the second solid electrolyte layer includes a metal oxide having a perovskite structure and represented by Formula (1) below:

$$Ba_{x1}Sr_{x2}A_{1-y}M_yO_{3-\delta} \qquad (1)$$

(where Element A is at least one selected from the group consisting of Zr, Ce, and Hf, Element M is at least one selected from the group consisting of Y, Yb, Er, Ho, Tm, Gd, In, and Sc, $\delta$ is an oxygen deficiency, and $0.95 \leq x1+x2 \leq 1.10$ and $0 < y \leq 0.5$ are satisfied). In this case, in the solid electrolyte layer constituting the proton-conductive cell structure, a three phase interface between an air electrode material, air, and an electrolyte may be increased, thereby improving electrode activity. Therefore, the proton-conductive cell structure has a better ion transport number.

(6) In the proton-conductive cell structure according to (5), it is preferable that, in the metal oxide in Formula (1) above, 50 at % or more of Element A is Zr, and Element M is Y. When half or more of Element A is Zr, chemical stability may be enhanced. When Element M is Y, the proton conductivity may be increased.

(7) A proton-conductive material according to the present disclosure is a proton-conductive material used as the first solid electrolyte layer in the proton-conductive cell structure of the present disclosure. The proton-conductive material is a layer material formed of a compact material, and includes a metal oxide having a perovskite structure and represented by Formula (1) below:

$$Ba_{x1}Sr_{x2}A_{1-y}M_yO_{3-\delta} \quad (1)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x1+x2 \leq 1.10$ and $0 < y \leq 0.5$ are satisfied), in a region near a first main surface, a ratio of Sr to a total amount of Ba and Sr (Sr/[Ba+Sr]: based on a number of atoms) is 0.4 or more, and in a region near a second main surface, the ratio of Sr to the total amount of Ba and Sr (Sr/[Ba+Sr]) is 0.003 to 0.3. The proton-conductive material (7) has a low resistance and a high ion transport number.

(8) In the proton-conductive material according to (7), it is preferable that, in a central region in a thickness direction, the ratio of Sr to the total amount of Ba and Sr (Sr/[Ba+Sr]) is 0.005 to 0.3.

(9) In the proton-conductive material according to (7) or (8), it is preferable that, in a region extending, in a thickness direction, from a side of the first main surface toward a side of the second main surface and corresponding to 6% of a total thickness, the ratio of Sr to the total amount of Ba and Sr (Sr/[Ba+Sr]) is 0.3 or more.

(10) In the proton-conductive material according to any one of (7) to (9), it is preferable that, in the metal oxide represented by Formula (1) above, 50 at % or more of Element A is Zr, and Element M is Y.

The proton-conductive cell structure of the present disclosure may be provided by using the proton-conductive materials of the above (7) to (10).

(11) An electrochemical device according to the present disclosure includes the proton-conductive cell structure according to any one of (1) to (6) above.

The electrochemical device includes a solid electrolyte layer having low resistance and high ion transport number.

The electrochemical device is, for example, a fuel cell, a steam electrolysis cell, or a gas decomposition device.

(12) A method of manufacturing a proton-conductive material according to the present disclosure is a method of manufacturing a proton-conductive material used as the first solid electrolyte layer of the proton-conductive cell structure according to any one of (1) to (4), the method includes bringing, into contact with an air-electrode-side surface of a first solid electrolyte precursor layer including a metal oxide having a perovskite structure and represented by Formula (2) below:

$$Ba_{x1}A_{1-y}M_yO_{3-\delta} \quad (2)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x1 \leq 1.10$ and $0 < y \leq 0.5$ are satisfied), a mixture of a powder of a strontium compound and a powder of a metal oxide having a perovskite structure and represented by Formula (3) below:

$$Sr_{x2}A_{1-y}M_yO_{3-\delta} \quad (3)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x2 \leq 1.10$ and $0 < y \leq 0.5$ are satisfied), and in this state, performing heat-treatment at 1200° C. to 1400° C.

(13) Another method of manufacturing a proton-conductive material according to the present disclosure is a method of manufacturing a proton-conductive material used as the solid electrolyte layer of the proton-conductive cell structure according to (5) or (6), the method includes applying, to an air-electrode-side surface of a first solid electrolyte precursor layer including a metal oxide having a perovskite structure and represented by Formula (2) below:

$$Ba_{x1}A_{1-y}M_yO_{3-\delta} \quad (2)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x1 \leq 1.10$ and $0 < y \leq 0.5$ are satisfied), a paste including a binder, a powder of a strontium compound, and a powder of a metal oxide having a perovskite structure and represented by Formula (3) below:

$$Sr_{x2}A_{1-y}M_yO_{3-\delta} \quad (3)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x2 \leq 1.10$ and $0 < y \leq 0.5$ are satisfied), and in this state, performing heat-treatment at 1200° C. to 1400° C.

According to the method of manufacturing a proton-conductive material of the above (12) and (13), the proton-conductive material according to the present disclosure may be manufactured.

[Details of Embodiments]

Specific examples of the embodiments in the present disclosure will be described below with reference to the drawings as appropriate. However, the embodiments of the present invention are not limited to these examples. The scope of the present invention is defined by the claims, and is intended to include meanings equivalent to the claims and all modifications within the scope.

First Embodiment

[Proton-Conductive Cell Structure]

FIG. 1 is a schematic view showing an example of a proton-conductive cell structure according to the present disclosure.

A proton-conductive cell structure 10 according to the embodiment of the present disclosure includes an air electrode 11, a hydrogen electrode 12, and a solid electrolyte layer (proton-conductive material) 13 disposed between air electrode 11 and hydrogen electrode 12.

In proton-conductive cell structure 10, solid electrolyte layer 13 is sandwiched between air electrode 11 and hydrogen electrode 12, a first main surface 14 of solid electrolyte layer 13 is in contact with air electrode 11, and a second main surface 15 of solid electrolyte layer 13 is in contact with hydrogen electrode 12. Hydrogen electrode 12 and solid electrolyte layer 13 are integrated by firing to form a composite of hydrogen electrode 12 and solid electrolyte layer 13.

The thickness of solid electrolyte layer 13 is, for example, preferably 3 μm to 100 μm, more preferably 5 μm to 20 μm.

The thickness of hydrogen electrode 12 is larger than that of air electrode 11, and hydrogen electrode 12 functions as a support that supports solid electrolyte layer 13 (and thus proton-conductive cell structure 10). However, the thickness of hydrogen electrode 12 does not necessarily have to be larger than the thickness of air electrode 11, and for example, the thickness of hydrogen electrode 12 and the thickness of air electrode 11 may be substantially the same.

<Solid Electrolyte Layer (Proton-Conductive Material)>

Solid electrolyte layer 13 is a layer made of a compact material and includes a predetermined metal oxide having proton conductivity.

The metal oxide has a perovskite structure and is represented by the following Formula (1):

$$Ba_{x1}Sr_{x2}A_{1-y}M_yO_{3-\delta} \quad (1)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x1+x2 \leq 1.10$ and $0 < y \leq 0.5$ are satisfied).

In the metal oxide, it is preferable that 50 at % (atomic percent) or more of Element A is Zr and Element M is Y because a proton-conductive material having low resistance and high chemical resistance may be provided. At this time, it is preferable that the ratio of Zr in Element A is as high as possible.

Solid electrolyte layer 13 contains the metal oxide represented by the Formula (1) above, and has different composition ratios of Ba and Sr in the thickness direction, and is configured such that the ratio of Sr to the total amount of Ba and Sr is higher on air electrode 11 side than on hydrogen electrode 12 side.

By inclining the ratio of Sr (and the ratio of Ba) along the thickness direction of solid electrolyte layer 13, it is possible to increase the ion transport number while suppressing the resistance of solid electrolyte layer 13 to a low level.

Therefore, in the metal oxide represented by the Formula (1) above, the ratio x1 of Ba and the ratio x2 of Sr vary depending on the position in solid electrolyte layer 13. The ratio x1 of Ba is set higher on hydrogen electrode 12 side than on air electrode 11 side to increase the proton conductivity. The ratio x2 of Sr is set higher on air electrode 11 side than on hydrogen electrode 12 side to increase the ion transport number.

In the near-surface region on air electrode 11 side of solid electrolyte layer 13, the ratio of Sr to the total amount of Ba and Sr (Sr/[Ba+Sr]: based on the number of atoms) is 0.4 or more.

Thus, a high ion transport number in solid electrolyte layer 13 is ensured. When the ratio of Sr on air electrode 11 side is less than 0.4, the ion transport number is low, and hole conduction easily occurs in an oxygen atmosphere.

The upper limit of the ratio of Sr on air electrode 11 side is not particularly limited, and the ratio of Sr may be 1.0 or less.

In the near-surface region on hydrogen electrode 12 side of solid electrolyte layer 13, the ratio of Sr to the total amount of Ba and Sr (Sr/[Ba+Sr]: based on the number of atoms) is 0.003 to 0.3.

Thus, the low resistance of solid electrolyte layer 13 is ensured. When the ratio of Sr on hydrogen electrode 12 side exceeds 0.3, the resistance of solid electrolyte layer 13 increases. Since the presence of a small amount of Sr together with Ba improves the proton conductivity, the resistance of solid electrolyte layer 13 also increases when the ratio of Sr is less than 0.003.

In the near-surface region on hydrogen electrode 12 side of solid electrolyte layer 13, the ratio of Sr to the total amount of Ba and Sr (Sr/[Ba+Sr]) is preferably 0.003 to 0.1 from the viewpoint of lowering the resistance.

In the present disclosure, the near-surface region of solid electrolyte layer 13 refers to a position 0.5 μm inward from each of main surfaces 14 and 15 of solid electrolyte layer 13 along the thickness direction.

The ratio of Sr to the total amount of Ba and Sr (Sr/[Ba+Sr]: based on the number of atoms) in solid electrolyte layer 13 is calculated by observing a cross section of solid electrolyte layer 13 with a field emission-electron probe micro analysis (FE-EPMA). Here, a normal line with respect to first main surface (surface on air electrode 11 side) 14 of solid electrolyte layer 13 is drawn, the respective element amounts of Ba and Sr are measured at intervals of 0.1 μm along the normal line, and the ratio of Sr to the total amount of Ba and Sr is calculated from the result.

Then, a value calculated from an observation result at a position 0.5 μm inward from the main surface of solid electrolyte layer 13 in the thickness direction or a position closest to this position is set as a measurement value of the near-surface region of solid electrolyte layer 13.

In solid electrolyte layer 13, the ratio of Sr to the total amount of Ba and Sr (Sr/[Ba+Sr]) in a central region in the thickness direction is preferably 0.005 to 0.3.

In this case, solid electrolyte layer 13 is more suitable for increasing the ion transport number while keeping the resistance low.

On the other hand, when the ratio of Sr (Sr/[Ba+Sr]) in a central region in the thickness direction of solid electrolyte layer 13 is less than 0.005 or exceeds 0.3, the resistance of solid electrolyte layer 13 may be increased.

The central region in the thickness direction of solid electrolyte layer 13 refers to a position equidistant from two main surfaces 14 and 15 of solid electrolyte layer 13. Then, a value calculated from an observation result at a position equidistant from two main surfaces 14 and 15 of solid electrolyte layer 13 or a position closest to this position is set as a measurement value of the central region in the thickness direction of solid electrolyte layer 13.

In solid electrolyte layer 13, it is preferable that the ratio of Sr to the total amount of Ba and Sr (Sr/[Ba+Sr]) is 0.3 or more in the entire region of 6% of the total thickness from the surface on air electrode 11 side toward hydrogen electrode 12 side in the thickness direction.

Since the ion transport number of solid electrolyte layer 13 is likely to decrease on air electrode 11 side, a high ion transport number may be ensured by satisfying the above-described configuration.

The proton-conductive material according to the present disclosure can ensure a high ion transport number even in an oxygen atmosphere. The ion transport number is the ratio of the amount of electricity carried by anions and cations to the total amount of electricity carried by electrons, holes, anions, and cations when a current is passed through an electrolyte. When the total amount of electricity carried is equal to the amount of electricity carried by the anions and cations, the ion transport number is 1. For example, in the case of BZY or SZY, since protons, oxide ions, and holes are present as carriers, the ion transport number indicates a ratio of electricity flowing by protons and oxide ions to the whole.

<Air Electrode>

For example, in the case of a fuel cell, air electrode 11 has a structure of a porous material capable of adsorbing, dissociating and ionizing oxygen molecules.

In air electrode 11, a reaction between the protons conducted through solid electrolyte layer 13 and oxide ions (reduction reaction of oxygen) occurs. The oxide ions are generated by dissociation of the oxidant (oxygen) introduced from the oxidant flow path.

As a material of air electrode 11, for example, a known material used as a cathode of a fuel cell may be used. Among them, a compound containing lanthanum and having a perovskite structure (ferrite, manganite, cobaltite, or the like) is preferable, and among these compounds, a compound further containing strontium is more preferable. Specific examples thereof include lanthanum strontium cobalt ferrite (LSCF: $La_{1-x}Sr_xFe_{1-y}Co_yO_{3-\delta}$, $0<x<1$, $0<y<1$), lanthanum strontium manganite (LSM: $La_{1-x}Sr_xMnO_{3-\delta}$, $0<x<1$), and lanthanum strontium cobaltite (LSC: $La_{1-x}Sr_xCoO_{3-\delta}$, $0<x<1$). Here, $\delta$ represents oxygen deficiency.

Air electrode 11 may be formed, for example, by sintering the above materials. Air electrode 11 may contain a catalyst such as Pt from the viewpoint of promoting the reaction between protons and oxide ions. When the catalyst is contained, air electrode 11 may be formed by mixing the catalyst and the above-described material and sintering the mixture. At this time, if necessary, a binder, an additive, a dispersion medium, or the like may be used together with the material of air electrode 11.

The thickness of air electrode 11 is not particularly limited, but may be about 5 μm to 40 μm.

When proton-conductive cell structure 10 is a steam electrolysis cell, for example, a composite of Ni and yttrium-stabilized zirconia may be used as the material of air electrode 11.

<Hydrogen Electrode>

Hydrogen electrode 12 has a structure of a porous material. In hydrogen electrode 12, for example, in the case of a fuel cell, a reaction (fuel oxidation reaction) in which a fuel such as hydrogen is oxidized and protons and electrons are released occurs.

As a material of hydrogen electrode 12, for example, a material used as an anode of a fuel cell may be used.

Specific examples thereof include a composite of nickel or a nickel compound (nickel oxide or the like) as a catalyst component and a proton-conductive material. The nickel compound is reduced during use of the cell structure to form Ni. As the proton-conductive material, a metal oxide represented by the following formula (2) is used.

Hydrogen electrode 12 may be formed, for example, by mixing NiO powder and powder of a metal oxide represented by the following Formula (2) and sintering the mixture.

A thickness of hydrogen electrode 12 may be, for example, 10 μm to 2 mm or 10 μm to 100 μm.

Hydrogen electrode 12 may be increased in thickness to provide a function as a support for supporting solid electrolyte layer 13. In this case, hydrogen electrode 12 may be, for example, 100 μm to 2 mm thick.

When proton-conductive cell structure 10 is a steam electrolysis cell, for example, a conductive oxide stable in an oxidizing atmosphere, such as strontium-added lanthanum manganese oxide, may be used as the material of hydrogen electrode 12.

[Electrochemical Device]

Proton-conductive cell structure 10 may be used as a constituent member of an electrochemical device.

Examples of the electrochemical device include a fuel cell, a steam electrolysis cell, and a gas decomposition device.

<Fuel Cell>

The fuel cell may include proton-conductive cell structure 10, and may have a configuration similar to the configuration of a conventional fuel cell.

Specifically, for example, a separator in which an oxidant flow path for supplying an oxidant to air electrode 11 is formed via a current collector is provided on air electrode 11 side of proton-conductive cell structure 10, and a separator in which a fuel flow path for supplying a fuel to hydrogen electrode 12 is formed via a current collector is provided on hydrogen electrode 12 side of proton-conductive cell structure 10.

Since the fuel cell according to the present disclosure includes proton-conductive cell structure 10, both high output and high ion transport number may be achieved.

The fuel cell may be manufactured by a known method except that proton-conductive cell structure 10 is used.

<Steam Electrolysis Cell>

It is sufficient that the steam electrolysis cell includes proton-conductive cell structure 10, and known configurations may be adopted for other configurations. The steam electrolysis cell may be manufactured by a known method except that proton-conductive cell structure 10 is used.

<Gas Decomposition Device>

The gas decomposition apparatus may include proton-conductive cell structure 10.

When a gas containing a gas such as ammonia, methane, or propane is introduced into hydrogen electrode 12 of proton-conductive cell structure 10, a decomposition reaction of the gas occurs in hydrogen electrode 12 to generate hydrogen. Therefore, proton-conductive cell structure 10 may be used in a gas decomposition apparatus.

For example, hydrogen generated by decomposition of ammonia is oxidized by hydrogen electrode 12 to generate protons. The generated protons move to oxygen electrode 11 through solid electrolyte layer 13. On the other hand, $N_2$ simultaneously produced by the decomposition of ammonia is discharged as exhaust gas.

In the gas decomposition apparatus, oxygen electrode 11 may contain a catalyst having a function of decomposing the gas. Examples of the catalyst having a function of decomposing a gas such as ammonia include compounds containing at least one catalyst component selected from the group consisting of Fe, Co, Ti, Mo, W, Mn, Ru, and Cu.

[Method of Manufacturing Proton-Conductive Cell Structure]

Proton-conductive cell structure 10 may be manufactured by a method including:
(1) preparing an air electrode material, a solid electrolyte material A, a solid electrolyte material B, and a hydrogen electrode material (first step);
(2) stacking a layer including the hydrogen electrode material and a layer including the solid electrolyte material A together, and heating the obtained stacked body to form a composite in which hydrogen electrode 12 and solid electrolyte precursor layer are integrated (second step);

(3) forming a composite of hydrogen electrode 12 and solid electrolyte layer 13 by bringing solid electrolyte material B into contact with a surface of the solid electrolyte precursor layer opposite to hydrogen electrode 12 and heating the obtained material in that state (third step); and (4) stacking a layer including the air electrode material on a surface (a surface opposite to the hydrogen electrode-side) of solid electrolyte layer 13 and heating the obtained stacked body to form the air electrode 11 (fourth step).

(First Step)

An air electrode material, a solid electrolyte material A, a solid electrolyte material B, and a hydrogen electrode material are prepared.

Here, as the hydrogen electrode material, a mixture of a nickel compound and a metal oxide having a perovskite structure and represented by Formula (2) below:

$$Ba_{x1}A_{1-y}M_yO_{3-\delta} \quad (2)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x1 \leq 1.10$ and $0 < y \leq 0.5$ are satisfied), is prepared.

The hydrogen electrode material is preferably a mixture of NiO powder and metal oxide powder represented by the Formula (2) above. The composition of the metal oxide represented by the Formula (2) above is preferably the same as the composition of the metal oxide represented by the Formula (2) above contained in the solid electrolyte material A.

As the solid electrolyte material A, a paste or slurry obtained by mixing a powder of the metal oxide represented by the Formula (2) above, a binder, and a dispersion medium is prepared.

Examples of the binder include, but are not particularly limited to, known materials used in the production of ceramic materials, such as polymer binders and waxes. Examples of the polymer binder include cellulose derivatives, vinyl acetate-based resins, and acrylic resins. Examples of the cellulose derivative include ethyl cellulose and cellulose ether. The concept of the vinyl acetate-based resin includes a saponified product of a vinyl acetate-based resin such as polyvinyl alcohol. Examples of the wax include paraffin wax and the like.

The amount of the binder is not particularly limited, and may be, for example, 1 part by mass to 20 parts by mass, and preferably 1.5 parts by mass to 15 parts by mass with respect to 100 parts by mass of the powder of the metal oxide represented by the Formula (2) above.

Examples of the dispersion medium include, but are not particularly limited to, water and organic solvents. Examples of the organic solvent include hydrocarbons such as toluene; alcohols such as ethanol and isopropanol; carbitol such as butyl carbitol acetate; and the like.

The amount of the dispersion medium is not particularly limited, and may be, for example, 50 parts by mass to 200 parts by mass with respect to 100 parts by mass of the powder of the metal oxide represented by the Formula (2) above.

If necessary, the solid electrolyte material A may contain various additives such as a surfactant and a deflocculant.

In the solid electrolyte material A, the composition of the metal oxide represented by the Formula (2) above may be appropriately determined in consideration of the constituent elements and the composition ratio of the solid electrolyte layer to be formed.

As the solid electrolyte material B, a mixture of powder of a strontium compound (Sr compound) such as $SrCO_3$ and powder of a metal oxide having a perovskite structure and satisfying the following Formula (3) is prepared:

$$Sr_{x2}A_{1-y}M_yO_{3-\delta} \quad (3)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x2 \leq 1.10$ and $0 < y \leq 0.5$ are satisfied).

In the solid electrolyte material B, the composition of the metal oxide represented by the above Formula (3) may be appropriately determined in consideration of the constituent elements and the composition ratio of the solid electrolyte layer to be formed.

In the solid electrolyte material B, the mixing ratio of the powder of the metal oxide represented by the above Formula (3) and the powder of the Sr compound such as $SrCO_3$ is preferably metal oxide: Sr compound=99:1 to 70:30 on a weight basis. When the ratio of the Sr compound is too small, Sr may not sufficiently diffuse into the solid electrolyte precursor layer. On the other hand, when the ratio of the Sr compound is too large, in the metal oxide represented by the Formula (1) constituting the solid electrolyte layer, $x1+x2>1.1$ is likely to be satisfied, and chemical stabilities may be lowered.

As the air electrode material, a paste or slurry obtained by mixing powder of LSCF or LSM which is a material for the air electrode, a binder, and a dispersion medium is prepared.

Here, examples of the binder and the dispersion medium are the same as those used for the solid electrolyte material A.

The amounts of the binder and the dispersion medium are not particularly limited, and may be appropriately selected so as to be suitable for application of the air electrode material.

(Second Step)

In the second step, the layer including the hydrogen electrode material and the layer including the solid electrolyte material A are stacked, and main firing is performed by heating at 1300 to 1700° C. to form a composite of hydrogen electrode 12 and the solid electrolyte precursor layer.

In this step, the hydrogen electrode material and the solid electrolyte material A are co-sintered to form a composite.

Here, the method for forming each layer is not particularly limited, and the layer including the hydrogen electrode material may be formed by, for example, press molding such as uniaxial molding. The layer including the hydrogen electrode material may be calcined after molding and before stacking the layer including the solid electrolyte material A thereon. The calcination may be performed at a temperature (for example, 900° C. to 1100° C.) lower than the temperature at which the hydrogen electrode material is sintered. By performing the calcination, it becomes easy to apply the solid electrolyte material A.

The layer including the solid electrolyte material A may be formed by applying a paste or slurry of the solid electrolyte material A to the surface of the layer including the hydrogen electrode material by screen printing, spray coating, spin coating, dip coating, or the like.

In this step, after the layer including the solid electrolyte material A is formed, a binder removal treatment for removing a resin component such as a binder may be performed before the main firing is performed.

The binder removal treatment may be performed, for example, by heating at about 500° C. to 800° C. in the air.

In this step, a composite of the hydrogen electrode and the solid electrolyte precursor layer in which hydrogen electrode 12 and the solid electrolyte precursor layer are integrated is formed.

(Third Step)

In the third step, the solid electrolyte material B is brought into contact with the surface of the solid electrolyte precursor layer of the composite on the side opposite to hydrogen electrode 12 side, and heated in that state to form a composite of hydrogen electrode 12 and solid electrolyte layer 13.

Specifically, the composite is placed on a plate made of MgO or the like so that the solid electrolyte precursor layer is on the top, and the solid electrolyte material B (powder mixture) is poured thereon so that the composite is embedded in the solid electrolyte material B.

Thereafter, in this state, heat treatment is performed at 1200° C. to 1400° C. for 0 hours to 5 hours.

Thus, a hydrogen electrode-solid electrolyte layer composite in which hydrogen electrode 12 and solid electrolyte layer 13 are integrated may be produced.

Such a method of manufacturing a composite may be a method of manufacturing a proton-conductive material according to the present disclosure.

(Fourth Step)

In the fourth step, a layer including an air electrode material is stacked on the surface of solid electrolyte layer 13 of the hydrogen electrode-solid electrolyte layer composite, and firing is performed by heating at 800° C. to 1100° C., for example, to form air electrode 1.

The layer including the air electrode material may be formed by applying a paste or slurry of the air electrode material to the surface of solid electrolyte layer 13 by screen printing, spray coating, spin coating, dip coating, or the like.

In this step, binder removal treatment for removing a resin component such as a binder may be performed after forming the layer including the air electrode material and before performing firing.

The binder removal treatment may be performed, for example, by heating at about 500° C. to 800° C. in the air.

Proton-conductive type cell structure 10 may be manufactured by performing the first step to the fourth step.

In addition, after the third step and/or the fourth step, a cutting process, a grinding process, or the like may be performed on the side surface or the like of the solid electrolyte layer as necessary.

Second Embodiment

[Proton-Conductive Cell Structure]

Figure 2:
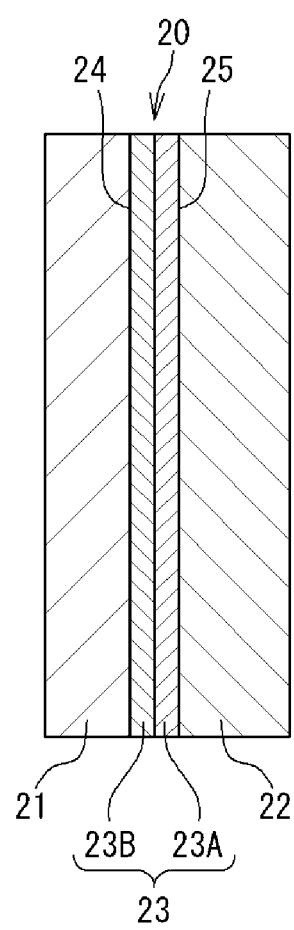
FIG. 2 is a schematic view showing another example of a proton-conductive cell structure according to the present disclosure.
Figure 3A:
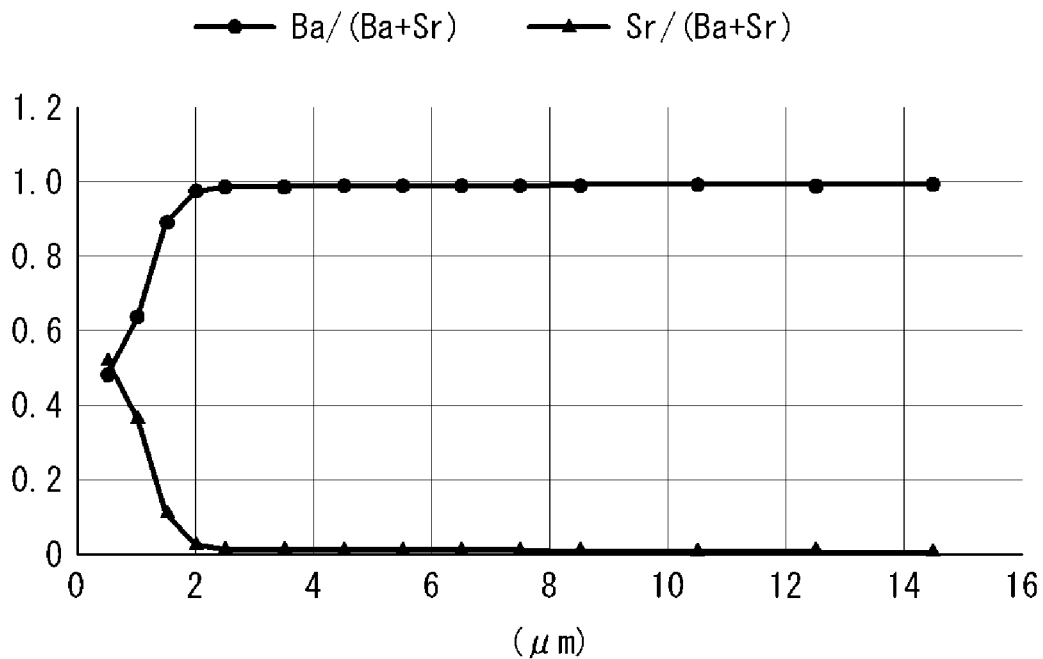
FIG. 3A is a diagram showing the element ratio of Ba and Sr in the solid electrolyte layer formed in Example 1.
Figure 3B:
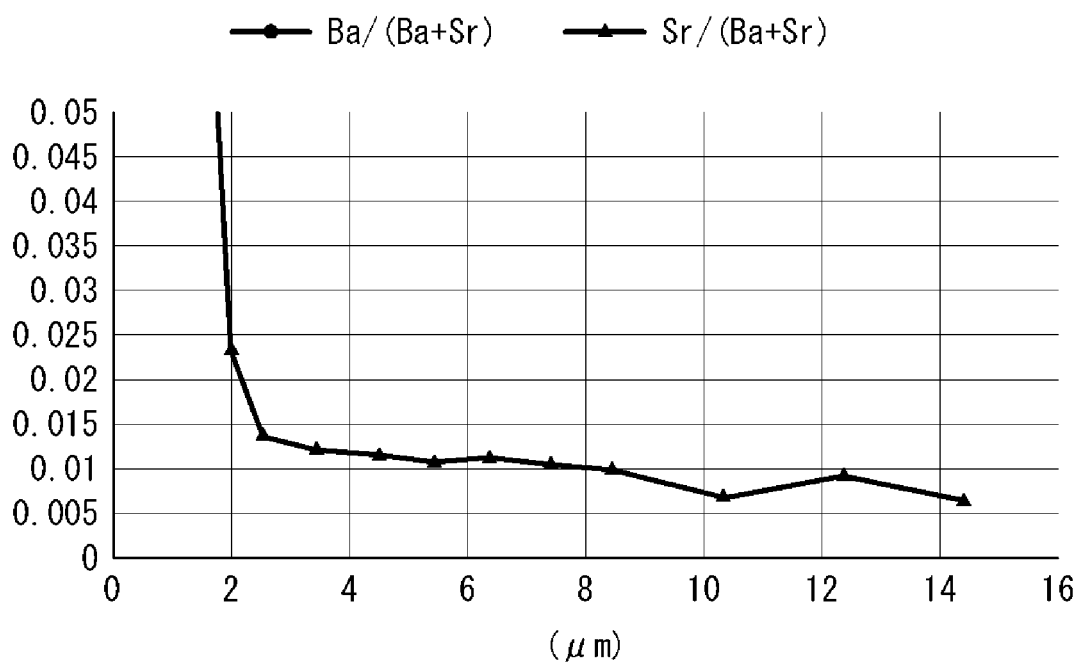
FIG. 3B is an enlarged view of a portion of FIG. 3A.
Figure 4A:
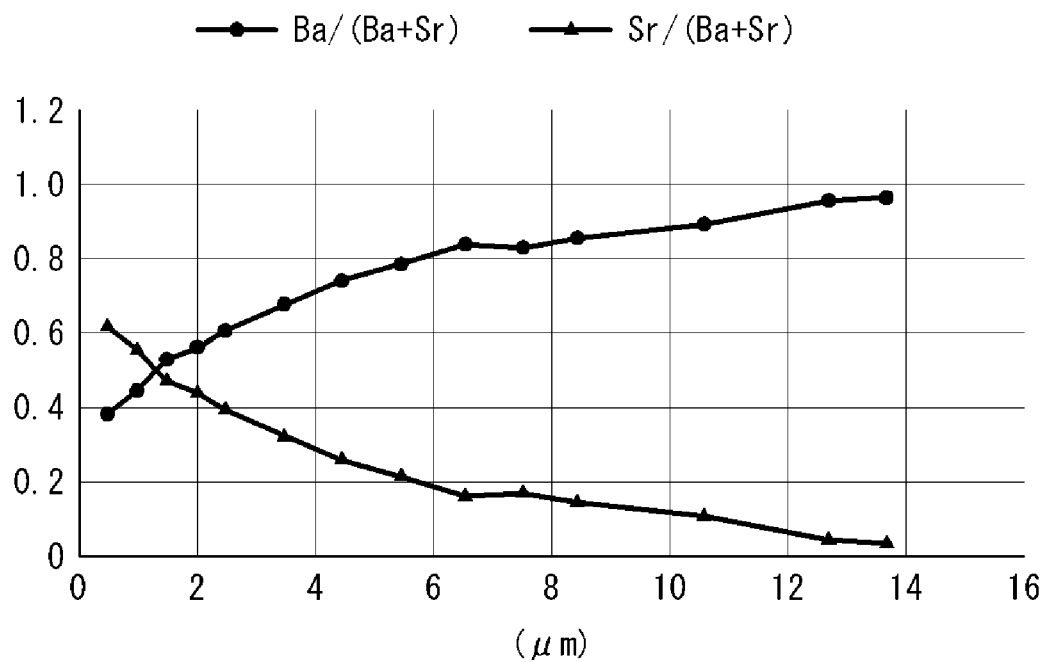
FIG. 4A is a diagram showing the element ratio of Ba and Sr in the solid electrolyte layer formed in Example 2.
Figure 4B:
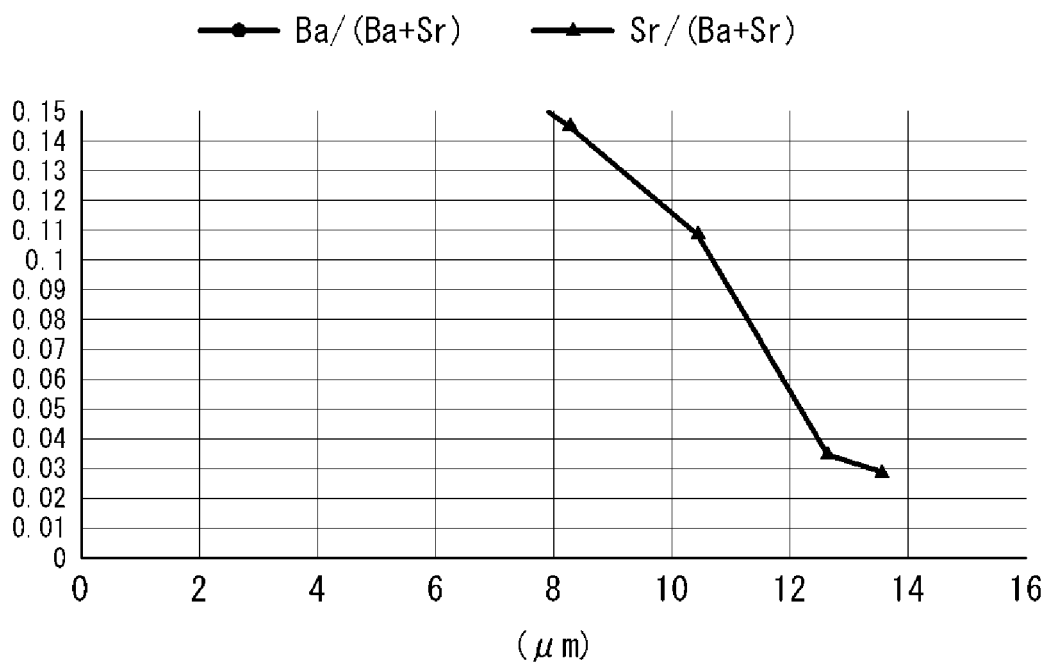
FIG. 4B is an enlarged view of a portion of FIG. 4A.
Figure 5:
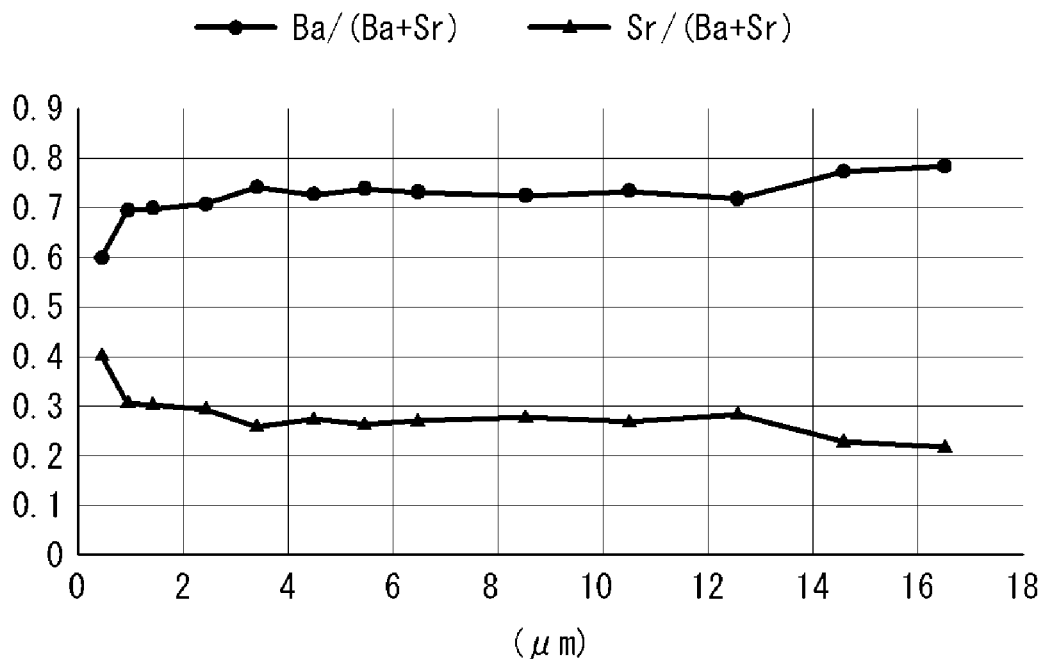
FIG. 5 is a diagram showing the element ratio of Ba and Sr in the solid electrolyte layer formed in Example 3.
Figure 6:
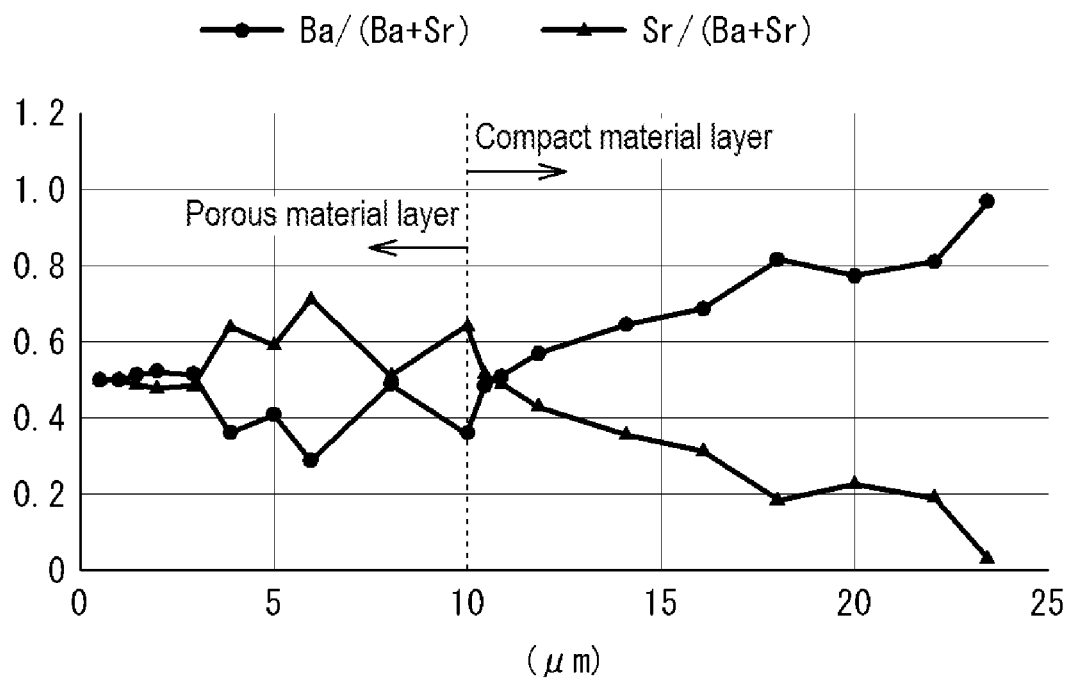
FIG. 6 is a diagram showing the element ratio of Ba and Sr in the solid electrolyte layer formed in Example 4.
Figure 7:
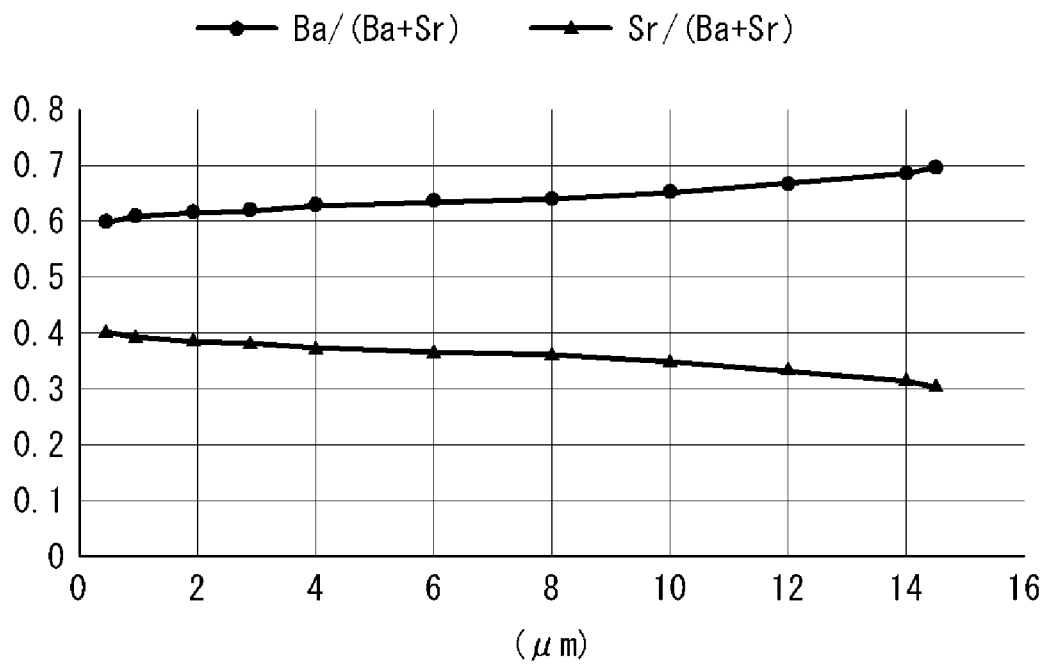
FIG. 7 is a diagram showing the element ratio of Ba and Sr in the solid electrolyte layer formed in Comparative Example 3.
Figure 8:
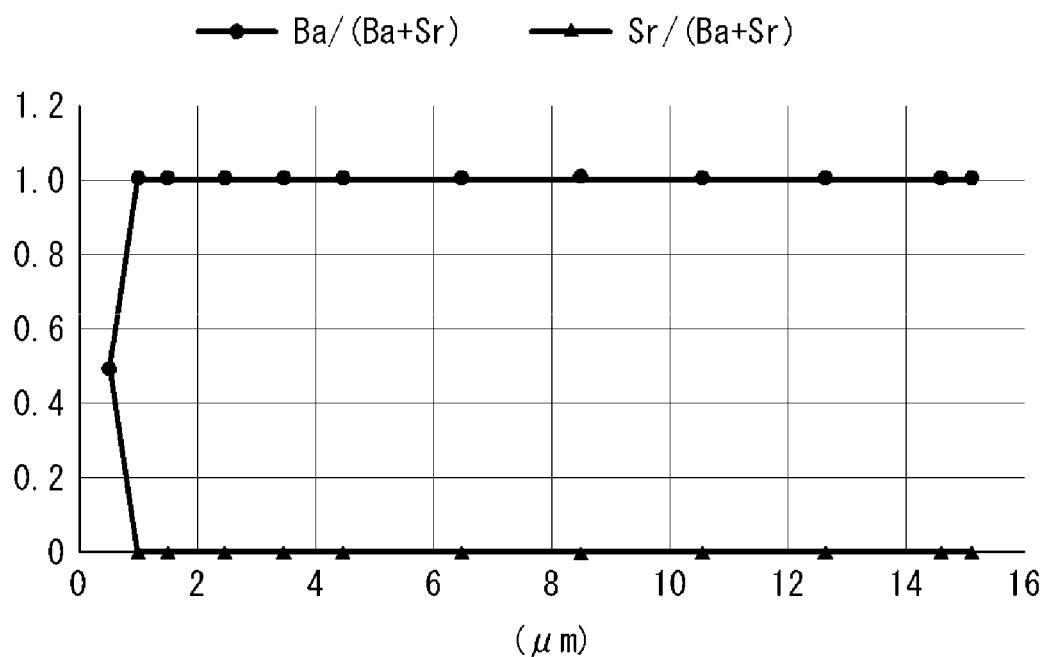
FIG. 8 is a diagram showing the element ratio of Ba and Sr in the solid electrolyte layer formed in Comparative Example 4.

FIG. 2 is a schematic view showing an example of a proton-conductive cell structure according to the present disclosure.

A proton-conductive cell structure 20 of the present embodiment of the present disclosure includes an air electrode 21, a hydrogen electrode 22, and a solid electrolyte layer (proton-conductive material) 23 disposed between air electrode 21 and hydrogen electrode 22. Solid electrolyte layer 23 includes a first solid electrolyte layer 23A made of a compact material and provided on hydrogen electrode 22 side, and a second solid electrolyte layer 23B made of a porous material and provided on air electrode 21 side.

Proton-conductive cell structure 20 of the present embodiment is different from proton-conductive cell structure 10 of the first embodiment in the configuration of solid electrolyte layer 23.

Solid electrolyte layer 23 has a two-layer structure. A main surface 24 of second solid electrolyte layer 23B on the side opposite to first solid electrolyte layer 23A side is in contact with air electrode 21, and a main surface 25 of first solid electrolyte layer 23A on the side opposite to second solid electrolyte layer 23B side is in contact with hydrogen electrode 22. Hydrogen electrode 22 and solid electrolyte layer 23 are integrated by firing to form a composite of hydrogen electrode 22 and solid electrolyte layer 23.

The thickness of first solid electrolyte layer 23A is, for example, preferably 3 μm to 100 μm, and more preferably 5 μm to 20 μm.

The thickness of second solid electrolyte layer 23B is, for example, preferably 3 μm to 30 μm, and more preferably 3 μm to 15 μm.

The total thickness of solid electrolyte layer 23 is preferably, for example, 6 μm to 35 μm.

<Solid Electrolyte Layer (Proton-Conductive Material)>

First solid electrolyte layer 23A is a layer made of a compact material and includes a predetermined metal oxide having proton conductivity. The configuration of first solid electrolyte layer 23A may be similar to the configuration of solid electrolyte layer 13 in the first embodiment.

The preferred configuration of first solid electrolyte layer 23A is the same as the preferred configuration of solid electrolyte layer 13 in the first embodiment.

Second solid electrolyte layer 23B is a layer made of a porous material, and includes a metal oxide having a perovskite structure and satisfying the following Formula (1):

$$Ba_{x1}Sr_{x2}A_{1-y}M_yO_{3-\delta} \qquad (1)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x1+x2 \leq 1.10$ and $0 < y \leq 0.5$ are satisfied).

In the embodiment of the present disclosure, solid electrolyte layer 23 has second solid electrolyte layer 23B made of a porous material in addition to first solid electrolyte layer 23A. Therefore, in solid electrolyte layer 23 (particularly, second solid electrolyte layer 23B), the three phase interface between the air electrode material, the air, and the electrolyte is increased, the electrode activity is improved, and the ion transport number is further improved.

The porosity of second solid electrolyte layer 23B is preferably 6 to 40% from the viewpoint of increasing the three phase interface between the air electrode material, the air, and the electrolyte and from the viewpoint of reducing the resistance.

In the embodiments of the present disclosure, whether the solid electrolyte layer is a porous material or a compact material is determined by observing a cross-section of the solid electrolyte layer cut along a thickness direction with a microscope. Specifically, the obtained microscopic image is divided into voids and non-voids by a binarization process, the ratio of the total area of the voids to the total area of the voids and the total area of the non-voids is calculated as the porosity, and the determination is made based on the obtained porosity. In an embodiment of the present disclosure, the layer having a porosity of 5% or less is a layer of compact material, and the layer having a porosity greater than 5% is a layer of porous material.

In the metal oxide contained in second solid electrolyte layer 23B, in the Formula (1) above, 50 at % or more of Element A is preferably Zr, and Element M is preferably Y. When half or more of Element A is Zr, chemical stability may be enhanced. When Element M is Y, the proton-conductivity may be increased. At this time, it is preferable that the ratio of Zr in Element A is as high as possible.

In the metal oxide contained in second solid electrolyte layer 23B, the ratio x1 of Ba and the ratio x2 of Sr in the Formula (1) above are preferably such that x1 satisfies $0 \leq x1 \leq 0.6$ and x2 satisfies $0.4 \leq x2 \leq 1.0$. Second solid electrolyte layer 23B may have the same composition as a whole, or the ratio x1 of Ba and the ratio x2 of Sr may be different depending on the position in second solid electrolyte layer 23B.

<Air Electrode/Hydrogen Electrode>

The configurations of air electrode 21 and hydrogen electrode 22 are the same as the configurations of air electrode 11 and hydrogen electrode 12 of the first embodiment.

[Electrochemical Device]

Similar to proton-conductive cell structure 10 of the first embodiment, proton-conductive cell structure 20 may be used as a constituent member of an electrochemical device such as a fuel cell, a steam electrolysis cell, or a gas decomposition device.

[Method of Manufacturing Proton-Conductive Cell Structure]

Proton-conductive cell structure 20 may be manufactured by a method including:

(1) preparing an air electrode material, a solid electrolyte material A, a solid electrolyte material C, and a hydrogen electrode material (first step);

(2) stacking a layer including the hydrogen electrode material and a layer including the solid electrolyte material A together, and heating the obtained stacked body to form a composite of hydrogen electrode 22 and solid electrolyte precursor layer (second step);

(3) applying the solid electrolyte material C to the surface of the solid electrolyte precursor layer opposite to hydrogen electrode 22 side and heating the obtained material in that state to form a composite of hydrogen electrode 22 and solid electrolyte layer 23 including first solid electrolyte layer 23A of the compact material and second solid electrolyte layer 23B of the porous material (third step); and (4) stacking a layer including the air electrode material on the surface (a surface opposite to the hydrogen electrode-side) of solid electrolyte layer 23 (second solid electrolyte layer 23B) and heating the obtained stacked body to form air electrode 21 (fourth step).

(First Step)

An air electrode material, a solid electrolyte material A, a solid electrolyte material C, and a hydrogen electrode material are prepared.

The air electrode material, the solid electrolyte material A, and the hydrogen electrode material are prepared in the same manner as in the first embodiment.

As the solid electrolyte material C, a paste or slurry obtained by mixing a powder of a strontium compound (Sr compound) such as $SrCO_3$, a binder, a dispersion medium, and a powder of a metal oxide having a perovskite structure and represented by Formula (3) below is prepared.

(3)

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and $0.95 \leq x2 \leq 1.10$ and $0 < y \leq 0.5$ are satisfied).

In the solid electrolyte material C, the composition of the metal oxide represented by the Formula (3) above may be appropriately determined in consideration of the constituent elements and the composition ratio of the solid electrolyte layer to be formed.

In the solid electrolyte material C, the mixing ratio of the powder of the metal oxide represented by the Formula (3) above and the powder of the Sr compound such as $SrCO_3$ is preferably metal oxide: Sr compound=99:1 to 75:25 on a weight basis. When the ratio of the Sr compound is too small, Sr may not sufficiently diffuse into the solid electrolyte precursor layer. On the other hand, when the ratio of the Sr compound is too large, in the metal oxide represented by the Formula (1) above constituting the solid electrolyte layer C, x1+x2>1.1 is likely to be satisfied, chemical stabilities may be lowered.

Examples of the binder include, but are not particularly limited to, known materials used in the production of ceramic materials, such as polymer binders and waxes. Examples of the polymer binder include cellulose derivatives, vinyl acetate-based resins, and acrylic resins. Examples of the cellulose derivative include ethyl cellulose and cellulose ether. The concept of the vinyl acetate-based resin includes a saponified product of a vinyl acetate-based resin such as polyvinyl alcohol. Examples of the wax include paraffin wax and the like.

The amount of the binder is not particularly limited, and may be, for example, 1 part by mass to 20 parts by mass, and preferably 1.5 parts by mass to 15 parts by mass with respect to 100 parts by mass of the total amount of the powder of the metal oxide represented by the Formula (3) above and the powder of the Sr compound.

Examples of the dispersion medium include, but are not particularly limited to, water and organic solvents. Examples of the organic solvent include hydrocarbons such as toluene; alcohols such as ethanol and isopropanol; carbitol such as butyl carbitol acetate; and the like.

The amount of the dispersion medium is not particularly limited, and may be, for example, 50 parts by mass to 150 parts by mass with respect to 100 parts by mass of the total amount of the powder of the metal oxide represented by the Formula (3) above and the powder of the Sr compound.

The solid electrolyte material C may further contain various additives such as a surfactant and a deflocculant as necessary.

(Second Step)

In the second step, the layer including the hydrogen electrode material and the layer including the solid electrolyte material A are stacked together, and main firing is performed by heating at 1300 to 1700° C. to form a composite of hydrogen electrode 22 and the solid electrolyte precursor layer.

This step may be performed in the same manner as the second step of the first embodiment.

(Third Step)

In the third step, a paste of the solid electrolyte material C is applied to the surface of the solid electrolyte precursor layer of the composite on the side opposite to hydrogen electrode 22 side, and heated in that state to form a composite of hydrogen electrode 22 and solid electrolyte layer 23.

Specifically, a paste of the solid electrolyte material C is applied to the surface of the solid electrolyte precursor layer (the surface opposite to hydrogen electrode 22 side) by a method such as screen printing, spray coating, spin coating, or dip coating.

Thereafter, in this state, heat treatment is performed at 1200° C. to 1400° C. for 0 hours to 5 hours. Thus, a hydrogen electrode-solid electrolyte layer composite in which hydrogen electrode 22 and solid electrolyte layer 23 are integrated may be produced.

In addition, by adopting the method of this step, it is possible to form solid electrolyte layer 23 having a two-layer structure including first solid electrolyte layer 23A made of a compact material and second solid electrolyte layer 23B made of a porous material.

Such a method of manufacturing a composite may be a method of manufacturing a proton-conductive material according to the present disclosure.

(Fourth Step)

In the fourth step, a layer including an air electrode material is stacked on the surface of solid electrolyte layer 23 of the hydrogen electrode-solid electrolyte layer composite, and firing is performed by heating at 800° C. to 1100° C., for example, to form air electrode 21.

This step may be performed in the same manner as the fourth step of the first embodiment. Proton-conductive type cell structure 20 may be manufactured by performing the first step to the fourth step.

In addition, after the third step and/or the fourth step, a cutting process, a grinding process, or the like may be performed on the side surface or the like of the solid electrolyte layer as necessary.

OTHER EMBODIMENTS

Although the shape of the proton-conductive cell structure of the first and second embodiments is a stacked type, the shape of the cell structure according to the present disclosure is not limited thereto. For example, it may have a cylindrical shape with the hydrogen electrode inside so as to have a hollow.

When the shape of the proton-conductive cell structure is a stacked type, the shape of each layer may be a rectangular plate shape or a disk shape.

EXAMPLES

Next, the present invention will be described in more detail based on examples, but the present invention is not limited only to these examples.

<Preparation of $BaZr_{0.8}Y_{0.2}O_{2.9}$ Powder>

Barium carbonate, zirconium oxide, and yttrium oxide were each placed in a ball mill at a molar ratio such that the ratio of Ba was 1.0 and the ratio of Y was 0.2, and mixed for 24 hours to obtain a mixture. The obtained mixture was calcined at 1000° C. for 10 hours. The calcined mixture was treated with a ball mill for 10 hours to be uniaxially molded, and then fired at 1300° C. for 10 hours in an air atmosphere. The fired sample was ground in a mortar and then treated in a ball mill for 10 hours. The obtained powder was again subjected to uniaxial molding, then fired at 1300° C. for 10 hours, and treated with a ball-milled for 10 hours to obtain $BaZr_{0.8}Y_{0.2}O_{2.9}$ powder (hereinafter also referred to as BZY20 powder).

<Preparation of $SrZr_{0.85}Y_{0.15}O_{2.975}$ Powder>

Strontium carbonate, zirconium oxide, and yttrium oxide were each placed in a ball mill at a molar ratio such that the ratio of Sr was 1.0 and the ratio of Y was 0.15, and mixed for 24 hours to obtain a mixture. The obtained mixture was calcined at 1000° C. for 10 hours. The calcined mixture was treated with a ball mill for 10 hours to be uniaxially molded, and then fired at 1300° C. for 10 hours in an air atmosphere. The fired sample was ground in a mortar and then treated in a ball mill for 10 hours. The obtained powder was again subjected to uniaxial molding, then calcined at 1300° C. for 10 hours, and ball-milled for 10 hours to obtain $SrZr_{0.85}Y_{0.15}O_{2.975}$ powder (hereinafter, also referred to as SZY15 powder).

Example 1

(1) NiO and BZY20 powder were mixed at 7:3 (weight ratio), ball-milled, and then subjected to uniaxial molding. The obtained molded body was calcined at 1000° C., and a BZY20 paste obtained by mixing 125 parts by weight of organic solvents (butylcarbitol acetate (BCA)) and 5 parts by weight of binder (ethyl cellulose) with respect to 100 parts by weight of BZY20 powder was stacked by screen-print on the calcined molded body. The obtained stacked body was subjected to binder removal treatment by heating at 750° C., and then co-sintered at 1450° C. to form a sintered body.

(2) The obtained sintered body was placed on a plate made of MgO with the side on which the BZY20 paste was stacked facing upward, a powder obtained by mixing SZY15 powder and $SrCO_3$ powder at 9:1 (weight ratio) was applied thereon to bury the sintered body in the powder, and heat treatment was performed in this state in a heating furnace at 1300° C. for 0 hours. Here, the heat treatment at 1300° C. for 0 hours refers to a heat treatment in which the furnace temperature is increased from 20° C. to 1300° C. over 6 hours and 40 minutes, and immediately after reaching 1300° C., the temperature is decreased from 1300° C. to 20° C. over 6 hours and 40 minutes (heat treatment pattern 1).

Through these steps, a hydrogen electrode-solid electrolyte layer composite A in which the disk-shaped hydrogen electrode and the solid electrolyte layer were integrated was produced.

The thickness of the solid electrolyte layer formed in this example was 15 μm.

Example 2

First, a sintered body was formed in the same manner as in the step (1) of Example 1. Thereafter, the sintered body was placed on a plate made of MgO with the side on which the BZY20 paste was stacked facing upward, a powder obtained by mixing SZY15 powder and $SrCO_3$ powder at 9:1 (weight ratio) was applied thereon to bury the sintered body in the powder, and heat treatment was performed in this state in a heating furnace at 1300° C. for 2 hours. Here, the heat treatment at 1300° C. for 2 hours refers to a heat treatment in which the furnace temperature is increased from 20° C. to 1300° C. over 6 hours and 40 minutes, the furnace temperature is maintained at 1300° C. for 2 hours, and then the temperature is decreased from 1300° C. to 20° C. over 6 hours and 40 minutes (heat treatment pattern 2).

Through the above-described heat treatment, a hydrogen electrode-solid electrolyte layer composite B was produced.

The thickness of the solid electrolyte layer formed in this example was 14 μm.

Example 3

First, a sintered body was formed in the same manner as in the step (1) of Example 1. Thereafter, the sintered body was placed on a plate made of MgO with the side on which the BZY20 paste was stacked facing upward, a powder obtained by mixing SZY15 powder and $SrCO_3$ powder at 9:1 (weight ratio) was applied thereon to bury the sintered body in the powder, and heat treatment was performed in this state in a heating furnace at 1400° C. for 2 hours. Here, the heat treatment at 1400° C. for 2 hours refers to a heat treatment in which the furnace temperature is increased from 20° C. to 1400° C. over 7 hours and 27 minutes, the furnace temperature is maintained at 1400° C. for 2 hours, and then the temperature is decreased from 1400° C. to 20° C. over 7 hours and 27 minutes (heat treatment pattern 3).

Through the above-described heat treatment, a hydrogen electrode-solid electrolyte layer composite C was produced.

The thickness of the solid electrolyte layer formed in this example was 17 µm.

Fourth Embodiment

First, a sintered body was formed in the same manner as in the step (1) of Example 1. Next, SZY15 powder and $SrCO_3$ powder were mixed at 9:1 (weight ratio), and a paste obtained by mixing 5 parts by weight of binder (ethyl cellulose) and 130 parts by weight of organic solvents (butyl carbitol acetate (BCA)) with respect to 100 parts by weight of the total amount of the SZY15 powder and $SrCO_3$ powder was stacked, by screen-printing, on the side of the obtained sintered body on which the BZY 20 paste was stacked. Thereafter, heat treatment (heat treatment pattern 1) was performed at 1300° C. for 0 hours in a heating furnace.

Through such heat treatment, a hydrogen electrode-solid electrolyte layer composite D was produced.

The thickness of the first solid electrolyte layer formed of the compact material was 14 µm, and the thickness of the second solid electrolyte layer formed of the porous material was 10 µm.

The porosity of the first solid electrolyte layer was 0%, and the porosity of the second solid electrolyte layer was 8%.

Comparative Example 1

A sintered body produced in the same manner as in the step (1) of Example 1 was used as a hydrogen electrode-solid electrolyte layer composite E of this comparative example. The thickness of the solid electrolyte layer formed in this comparative example was 16 µm.

Comparative Example 2

NiO and SZY15 powder were mixed at 7:3 (weight ratio), ball-milled, and then subjected to uniaxial molding. The obtained molded body was calcined at 1000° C., and a SZY15 paste obtained by mixing 140 parts by weight of organic solvents (butylcarbitol acetate (BCA)) and 5 parts by weight of binder (ethyl cellulose) with respect to 100 parts by weight of SZY15 powder was screen-printed on the calcined molded body.

The obtained stacked body was subjected to binder removal treatment by heating at 750° C., and then co-sintered at 1450° C. to form a sintered body.

This sintered body was used as a hydrogen electrode-solid electrolyte layer composite F of the present comparative example.

The thickness of the solid electrolyte layer formed in this comparative example was 15 µm.

Comparative Example 3

NiO and BZY20 powder were mixed at 7:3 (weight ratio), ball-milled, and then subjected to uniaxial molding. The obtained molded body was calcined at 1000° C., and the same SZY15 paste as in Comparative Example 2 was stacked on the calcined molded body by screen-printing.

The obtained stacked body was subjected to binder removal treatment by heating at 750° C., and then co-sintered at 1450° C. to form a sintered body.

This sintered body was used as a hydrogen electrode-solid electrolyte layer composite G of this comparative example.

The thickness of the solid electrolyte layer formed in this comparative example was 15 µm.

Comparative Example 4

First, a sintered body was formed in the same manner as in the step (1) of Example 1. Thereafter, a SZY 15 film of 500 nm was stacked, on the side of the obtained sintered body on which the BZY 20 paste was stacked, by a pulsed laser deposition (PLD) method.

A hydrogen electrode-solid electrolyte layer composite H was produced through such a step of forming a SZY15 film.

The thickness of the solid electrolyte layer formed in this comparative example was 15.5 µm.

<Cross Section Observation and Component Deposition>

Regarding the composition of the solid electrolyte layer in the hydrogen electrode-solid electrolyte layer composite produced in each of Examples 1 to 4 and Comparative Examples 3 and 4, the cross section of the solid electrolyte layer was observed and measured by a field emission electron probe microanalyzer (FE-EPMA), and "Ba/(Ba+Sr): based on the number of atoms" and "Sr/(Ba+Sr): based on the number of atoms" were calculated as the element ratio of the solid electrolyte layer. The results are shown in Table 1 and FIGS. 3A, 3B, 4A, 4B, 5, 6, 7 and 8. In the graphs of FIGS. 3A to 8, the horizontal axis represents the position in the thickness direction of the cross section of the solid electrolyte layer, and the vertical axis represents the element ratio of the solid electrolyte layer.

Here, the solid electrolyte layer as an observation sample was embedded in a resin, polished, then carbon was deposited on the entire sample, and then cross-section processing was performed using a cross-section polisher (SM-09010) manufactured by JEOL Ltd.

As the EPMA, JXA-8530F manufactured by JEOL was used and the measurement was performed under the following conditions.

Acceleration voltage: 15 kV

Irradiation current: 100 nA

Sampling time: is

Probe diameter: 0.1 µm in diameter

Sample feeding step: 0.1 µm

At this time, quantitative determination was performed by the ZAF method, and $BaF_2$ was used as a standard sample of Ba and $SrTiO_3$ was used as a standard sample of Sr (both standard samples manufactured by JEOL Ltd.).

TABLE 1

| | Total thickness of solid electrolyte layer (μm) | Air-electrode-side near-surface region of second solid electrolyte layer | Ratio of Sr:Sr/[Ba + Sr] Air-electrode-side near-surface region of first solid electrolyte layer | A minimum value in a region of 6% of total thickness from air-electrode-side surface to hydrogen-electrode-side of first solid electrolyte layer | A central region of first solid electrolyte layer | Hydrogen-electrode-side near-surface region of first solid electrolyte layer |
|---|---|---|---|---|---|---|
| Hydrogen electrode-solid electrolyte layer composite A | 15 | — | 0.518 | 0.39 | 0.011 | 0.006 |
| Hydrogen electrode-solid electrolyte layer composite B | 14 | — | 0.614 | 0.57 | 0.163 | 0.029 |
| Hydrogen electrode-solid electrolyte layer composite C | 17 | — | 0.405 | 0.31 | 0.280 | 0.221 |
| Hydrogen electrode-solid electrolyte layer composite D | 24 | 0.502 | 0.523 | 0.49 | 0.256 | 0.036 |
| Hydrogen electrode-solid electrolyte layer composite E | 16 | — | — | — | — | — |
| Hydrogen electrode-solid electrolyte layer composite F | 15 | — | — | — | — | — |
| Hydrogen electrode-solid electrolyte layer composite G | 15 | — | 0.397 | 0.39 | 0.364 | 0.308 |
| Hydrogen electrode-solid electrolyte layer composite H | 15.5 | — | 0.503 | 0 | 0 | 0 |

As shown in Table 1 and FIGS. 3A to 8, in the hydrogen electrode-solid electrolyte layer composites A to D produced in Examples 1 to 4, Sr/(Ba+Sr) was 0.4 or more in the near-surface region on the side opposite to the hydrogen electrode (also referred to as air-electrode-side) of the first solid electrolyte layer, and a composition gradient of Ba and Sr was formed in the solid electrolyte layer.

In addition, the porosities of the solid electrolyte layers in Examples 1 to 3 were 0%, and in the solid electrolyte layer in Example 4, a region having a porosity of 8% was formed in a region of 10 μm on the side opposite to the hydrogen-electrode-side (air-electrode-side).

On the other hand, in the hydrogen electrode-solid electrolyte layer composite G produced in Comparative Example 3, diffusion of Sr proceeded in the electrolyte layer, and the composition gradient of Sr became gentle. Sr/(Ba+Sr) was about 0.4 on the side of the solid electrolyte layer opposite to the hydrogen electrode (air-electrode-side), Sr/(Ba+Sr) was about 0.3 on the hydrogen-electrode-side of the solid electrolyte layer, and Sr/(Ba+Sr) was about 0.3 to 0.4 in the entire solid electrolyte layer.

In the hydrogen electrode-solid electrolyte layer composite H prepared in Comparative Example 4, Sr was not detected in the region where the distance from the side opposite to the hydrogen electrode of the solid electrolyte layer exceeded 1.0 μm.

<Electrochemical Measurement and Evaluation>

Fuel cells were produced using the hydrogen electrode-solid electrolyte layer composites A to H produced in Examples and Comparative Examples, and electrochemical measurements were performed using the obtained fuel cells.

(1) Production of Fuel Cell

As an air electrode material, an LSCF paste was prepared by mixing powders of LSCF ($La_{0.6}Sr_{0.4}Fe_{0.8}Co_{0.2}O_{3-\delta}$), solvents (butyl carbitol acetate), and binders (ethyl cellulose). The LSCF paste was applied to the surface of the solid electrolyte layer of the hydrogen electrode-solid electrolyte layer composite by screen printing. Subsequently, the LSCF was sintered by heat treatment at 1000° C. for 2 hours to form a cathode (air electrode) having a thickness of 10 μm, thereby obtaining a cell structure.

Platinum meshes to which lead wires were welded were attached to the surfaces of the air electrodes and the hydrogen electrodes of the obtained cell structure (16 mm in diameter) with a platinum paste.

The ends of the lead wires on the side opposite to the cell structure side were connected to a measuring instrument so that the current value and voltage value between the lead wires could be measured.

(2) Power Density Measurement

At an operating temperature of 600° C., in the produced the fuel cell, hydrogen gas was supplied as a fuel gas to the hydrogen electrode at 100 $cm^3$/min, and air was supplied to the air electrode at 200 $cm^3$/min. The air and hydrogen were humidified to a dew point of 25° C. The voltage was measured while changing the current density, and the maximum value of the power density was obtained from the current density and the voltage. The results are shown in Table 2.

(3) Measurement of Direct Current Resistance Change

The ratio ($R_{OCV}/R_{0.2}$) of a direct current resistance $R_{OCV}$ in the open circuit state and a direct current resistance $R_{0.2}$ with a voltage of OCV-0.2 V applied was calculated as an indicator of the ion transport number.

Each direct current resistance was measured by an electrochemical impedance method. At this time, a voltage value (OCV) in an open circuit state was also acquired.

1260A Impedance/Gain-phase Analyzer and Potentiostat 1287A manufactured by Solartron were used as the measuring apparatus, and a Nyquist diagram was obtained by plotting the real parts of the frequency response of the current value on the horizontal axis and the imaginary parts on the vertical axis when sweeping from $10^6$ Hz to 0.1 Hz with amplitudes of 10 mV with respect to OCV or OCV-0.2 V, and the intersection with the horizontal axis was read as the direct current resistance. The results are shown in Table 2.

In this evaluation, "$R_{OCV}/R_{0.2}$" is used as an indicator of the ion transport number. The reason is as follows.

Figure 9:
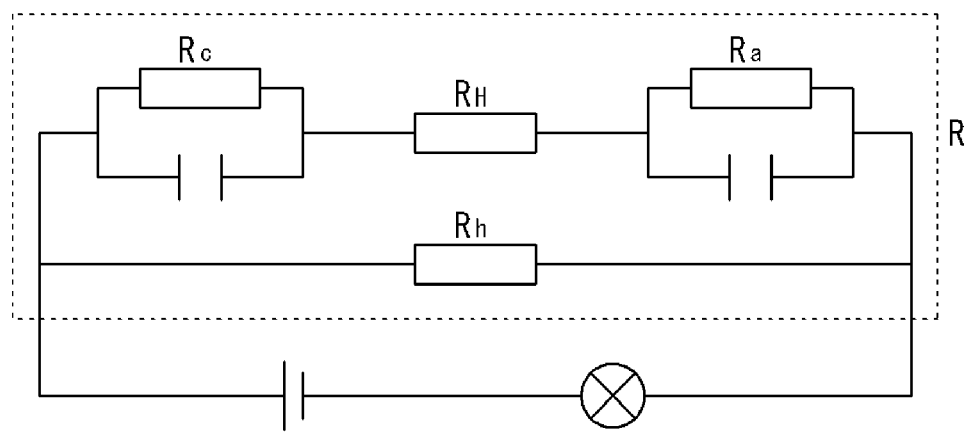
FIG. 9 is a diagram showing an equivalent circuit of a proton-conductive cell structure in which hole conduction is assumed.

FIG. 9 shows an equivalent circuit of a proton-conductive cell structure in which hole conduction is assumed. In FIG. 9, $R_H$ is the resistance of proton conduction, $R_h$ is the resistance of hole conduction, $R_c$ is the resistance of air electrode (cathode), $R_a$ is the resistance of hydrogen electrode (anode), and R is the total resistance.

Here, the conductivity σ and the ion transport number t of the proton-conductive material are defined as follows:

$$\sigma = \frac{1}{R} \quad \text{[Equation 1]}$$

$$t = \frac{\sigma_H}{\sigma_h + \sigma_H} = \frac{R_H}{R_h + R_H}$$

In the high-frequency side intercept of the impedance measurement, both $R_c$ and $R_a$ may be regarded as 0. Therefore, the total resistance (direct current resistance) R of the proton-conductive cell structure may be expressed as follows:

$$R = \frac{R_h R_H}{R_h + R_H} \quad \text{[Equation 2]}$$

According to Non-Patent Document: T. Onishi and T. Uda, Electrochemistry, 87 (3), 162 to 174 (2019), it is clarified that as the voltage applied to the cell structure increases, the hole conductivity of the cell structure increases, and thus the hole conductivity decreases when the voltage is applied to the power generation side rather than the open circuit state. Based on the disclosure of this reference, the hole conductivity in the OCV-0.2 V state is about one fifth of the hole conductivity in the open circuit state. Therefore, the resistance of hole conduction in the state of OCV-0.2 V is about five times the resistance of hole conduction in the state of OCV.

Here, in the case $R_{OCV}$ is the direct current resistance in the state of OCV, and $R_{0.2}$ is the direct current resistance in the state of OCV-0.2 V, and, given the Equation as below:

$$R_{OCV} = \frac{R_h R_H}{R_h + R_H} \quad \text{[Equation 3]}$$

the $R_{0.2}$ above may be expressed as follows:

$$R_{0.2} = \frac{5 R_h R_H}{5 R_h + R_H} \quad \text{[Equation 4]}$$

The ratio of $R_{OCV}$ to $R_{0.2}$ is expressed as follows:

$$\frac{R_{OCV}}{R_{0.2}} = \frac{\frac{R_h R_H}{R_h + R_H}}{\frac{5 R_h R_H}{5 R_h + R_H}} = \frac{1}{5} \cdot \frac{5 R_h + R_H}{R_h + R_H} = \frac{4}{5} \cdot \frac{R_h}{R_h + R_H} + \frac{1}{5} \quad \text{[Equation 5]}$$

$$= \frac{4}{5} t + \frac{1}{5}$$

$$t = \frac{5}{4} \cdot \frac{R_{OCV}}{R_{0.2}} - \frac{1}{4}$$

It can be understood that the ion transport number t in the open circuit state has a linear correlation with $R_{OCV}/R_{0.2}$. Therefore, in this evaluation, as described above, $R_{OCV}/R_{0.2}$ was used as an indicator of the ion transport number.

TABLE 2

| | OCV (V) | Power Density (mW/cm²) | Indicator of ion transport number ($R_{OCV}/R_{0.2}$) |
|---|---|---|---|
| Hydrogen electrode-solid electrolyte layer composite A | 1.035 | 282.2 | 0.90 |
| Hydrogen electrode-solid electrolyte layer composite B | 1.022 | 267.8 | 0.91 |
| Hydrogen electrode-solid electrolyte layer composite C | 1.032 | 201.3 | 0.90 |
| Hydrogen electrode-solid electrolyte layer composite D | 1.047 | 250.9 | 0.95 |
| Hydrogen electrode-solid electrolyte layer composite E | 1.031 | 280.0 | 0.85 |
| Hydrogen electrode-solid electrolyte layer composite F | 1.056 | 79.5 | 1.02 |
| Hydrogen electrode-solid electrolyte layer composite G | 0.980 | 192.2 | 0.87 |
| Hydrogen electrode-solid electrolyte layer composite H | 1.020 | 214.3 | 0.87 |

The fuel cells in which the hydrogen electrode-solid electrolyte layer composites of Examples 1 to 4 were evaluated had a higher transport number indicator than the fuel cells in which the hydrogen electrode-solid electrolyte layer composites of Comparative Examples 1, 3, and 4 were evaluated, and the electrochemical device according to the present disclosure had a favorable ion transport number while maintaining a high power density.

On the other hand, in the fuel cells in which the hydrogen electrode-solid electrolyte layer composites of Comparative Examples 1, 3, and 4 were evaluated, it was difficult to increase the ion transport number.

In the fuel cell in which the hydrogen electrode-solid electrolyte layer composite of Comparative Example 2 was evaluated, the transport number indicator was high, but the power density was extremely low.

From these results, it has become clear that both a high ion transport number and a high power may be achieved according to the present disclosure.

REFERENCE SIGNS LIST 10, 20 cell structure
11, 21 air electrode
12, 22 hydrogen electrode
13, 23 solid electrolyte layer
14, 24 (first) main surface
15, 25 (second) main surface
23A first solid electrolyte layer
23B second solid electrolyte layer

The invention claimed is:
1. A proton-conductive cell structure comprising an air electrode, a hydrogen electrode, and a solid electrolyte layer disposed between the air electrode and the hydrogen electrode, wherein the solid electrolyte layer at least includes a first solid electrolyte layer formed of a compact material,
the first solid electrolyte layer includes
a metal oxide having a perovskite structure and represented by Formula (1) below:

$$Ba_{x1}Sr_{x2}A_{1-y}M_yO_{3-\delta} \quad (1)$$

(where Element A is at least one selected from the group consisting of Zr, Ce, and Hf,
Element M is at least one selected from the group consisting of Y, Yb, Er, Ho, Tm, Gd, In, and Sc,
δ is an oxygen deficiency, and $0.95 \leq x1+x2 \leq 1.10$ and $0 < y \leq 0.5$ are satisfied)
in an air-electrode-side near-surface region of the first solid electrolyte layer, a ratio of Sr to a total amount of Ba and Sr (Sr/[Ba+Sr]: based on a number of atoms) is 0.4 or more, and
in a hydrogen-electrode-side near-surface region of the first solid electrolyte layer, the ratio of Sr to the total amount of Ba and Sr (Sr/[Ba+Sr]) is 0.003 to 0.3.

2. The proton-conductive cell structure according to claim 1, wherein, in a central region in a thickness direction of the first solid electrolyte layer, the ratio of Sr to the total amount of Ba and Sr (Sr/[Ba+Sr]) is 0.005 to 0.3.

3. The proton-conductive cell structure according to claim 1, wherein, in the first solid electrolyte layer, in a region extending, in a thickness direction, from an air-electrode-side surface toward a hydrogen electrode side and corresponding to 6% of a total thickness, the ratio of Sr to the total amount of Ba and Sr (Sr/[Ba+Sr]) is 0.3 or more.

4. The proton-conductive cell structure according to claim 1, wherein, in Formula (1) above,
Element A includes 50 at % or more of Zr, and
Element M is Y.

5. The proton-conductive cell structure according to claim 1, wherein the solid electrolyte layer further includes a second solid electrolyte layer disposed between the first solid electrolyte layer and the air electrode and formed of a porous material, and
the second solid electrolyte layer includes
a metal oxide having a perovskite structure and represented by Formula (1) below:

$$Ba_{x1}Sr_{x2}A_{1-y}M_yO_{3-\delta} \quad (1)$$

(where Element A is at least one selected from the group consisting of Zr, Ce, and Hf,
Element M is at least one selected from the group consisting of Y, Yb, Er, Ho, Tm, Gd, In, and Sc,
δ is an oxygen deficiency, and $0.95 \leq x1+x2 \leq 1.10$ and $0 < y \leq 0.5$ are satisfied).

6. The proton-conductive cell structure according to claim 5, wherein, in Formula (1) above,
Element A includes 50 at % or more of Zr, and
Element M is Y.

7. A proton-conductive material used as the first solid electrolyte layer in the proton-conductive cell structure according to claim 1,
wherein the proton-conductive material is a layer material formed of a compact material, and
includes a metal oxide having a perovskite structure and represented by Formula (1) below:

$$Ba_{x1}Sr_{x2}A_{1-y}M_yO_{3-\delta} \quad (1)$$

(where Element A is at least one selected from the group consisting of Zr, Ce, and Hf,
Element M is at least one selected from the group consisting of Y, Yb, Er, Ho, Tm, Gd, In, and Sc, δ is an oxygen deficiency, and $0.95 \leq x1+x2 \leq 1.10$ and $0 < y \leq 0.5$ are satisfied),
in a region near a first main surface, a ratio of Sr to a total amount of Ba and Sr (Sr/[Ba+Sr]: based on a number of atoms) is 0.4 or more, and
in a region near a second main surface, the ratio of Sr to the total amount of Ba and Sr (Sr/[Ba+Sr]) is 0.003 to 0.3.

8. The proton-conductive material according to claim 7, wherein, in a central region in a thickness direction, the ratio of Sr to the total amount of Ba and Sr (Sr/[Ba+Sr]) is 0.005 to 0.3.

9. The proton-conductive material according to claim 7, wherein, in a region extending, in a thickness direction, from a side of the first main surface toward a side of the second main surface and corresponding to 6% of a total thickness, the ratio of Sr to the total amount of Ba and Sr (Sr/[Ba+Sr]) is 0.3 or more.

10. The proton-conductive material according to of claim 7, wherein in Formula (1) above,
Element A includes 50 at % or more of Zr, and
Element M is Y.

11. An electrochemical device comprising the proton-conductive cell structure according to claim 1.

12. A method of manufacturing a proton-conductive material used as the first solid electrolyte layer of the proton-conductive cell structure according to claim 1,
the method comprising bringing, into contact with an air-electrode-side surface of a first solid electrolyte precursor layer including a metal oxide having a perovskite structure and represented by Formula (2) below:

$$Ba_{x1}A_{1-y}M_yO_{3-\delta} \quad (2)$$

(where Element A is at least one selected from the group consisting of Zr, Ce, and Hf,
Element M is at least one selected from the group consisting of Y, Yb, Er, Ho, Tm, Gd, In, and Sc,
δ is an oxygen deficiency, and $0.95 \leq x1 \leq 1.10$ and $0 < y \leq 0.5$ are satisfied),
a mixture of a powder of a strontium compound and a powder of a metal oxide having a perovskite structure and represented by Formula (3) below:

$$Sr_{x2}A_{1-y}M_yO_{3-\delta} \quad (3)$$

(where Element A is at least one selected from the group consisting of Zr, Ce, and Hf,
Element M is at least one selected from the group consisting of Y, Yb, Er, Ho, Tm, Gd, In, and Sc,
δ is an oxygen deficiency, and $0.95 \leq x2 \leq 1.10$ and $0 < y \leq 0.5$ are satisfied), and
in this state, performing heat-treatment at 1200° C. to 1400° C.

13. A method of manufacturing a proton-conductive material used as the solid electrolyte layer of the proton-conductive cell structure according to claim 5,
the method comprising applying, to an air-electrode-side surface of a first solid electrolyte precursor layer including a metal oxide having a perovskite structure and represented by Formula (2) below:

$$Ba_{x1}A_{1-y}M_yO_{3-\delta} \quad (2)$$

(where Element A is at least one selected from the group consisting of Zr, Ce, and Hf,
Element M is at least one selected from the group consisting of Y, Yb, Er, Ho, Tm, Gd, In, and Sc, δ is an oxygen deficiency, and 0.95≤x1≤1.10 and 0<y≤0.5 are satisfied), a paste including a binder, a powder of a strontium compound, and a powder of a metal oxide having a perovskite structure and represented by Formula (3) below:

$$Sr_{x2}A_{1-y}M_yO_{3-\delta} \qquad (3)$$

(where Element A is at least one selected from the group consisting of Zr, Ce, and Hf, Element M is at least one selected from the group consisting of Y, Yb, Er, Ho, Tm, Gd, In, and Sc, δ is an oxygen deficiency, and 0.95≤x2≤1.10 and 0<y≤0.5 are satisfied), and in this state, performing heat-treatment at 1200° C. to 1400° C.

* * * * *